(12) United States Patent
Yang et al.

(10) Patent No.: US 12,526,599 B2
(45) Date of Patent: Jan. 13, 2026

(54) LOCALIZATION USING AUDIO AND VISUAL DATA

(71) Applicant: Niantic Spatial, Inc., San Francisco, CA (US)

(72) Inventors: Karren Dai Yang, Medford, MA (US); Michael David Firman, London (GB); Eric Brachmann, Hanover (DE); Clément Godard, San Francisco, CA (US)

(73) Assignee: Niantic Spatial, Inc., San Francisco, CA (US)

( * ) Notice: Subject to any disclaimer, the term of this patent is extended or adjusted under 35 U.S.C. 154(b) by 279 days.

(21) Appl. No.: 18/213,175

(22) Filed: Jun. 22, 2023

(65) Prior Publication Data

US 2023/0421985 A1    Dec. 28, 2023

Related U.S. Application Data

(60) Provisional application No. 63/355,086, filed on Jun. 23, 2022.

(51) Int. Cl.
*H04S 7/00* (2006.01)
*G06T 7/73* (2017.01)

(52) U.S. Cl.
CPC ............... *H04S 7/303* (2013.01); *G06T 7/74* (2017.01); *G06T 2207/20084* (2013.01); *G06T 2207/30196* (2013.01)

(58) Field of Classification Search
None
See application file for complete search history.

(56) References Cited

U.S. PATENT DOCUMENTS

| 10,356,393 | B1* | 7/2019 | Binns | H04N 13/117 |
| 2010/0189271 | A1* | 7/2010 | Tsujino | G01S 5/16 |
| | | | | 381/56 |
| 2012/0163610 | A1* | 6/2012 | Sakagami | H04S 7/30 |
| | | | | 381/56 |
| 2017/0311080 | A1* | 10/2017 | Kolb | H04N 23/90 |
| 2017/0323472 | A1* | 11/2017 | Barnes | G01C 19/5776 |
| 2020/0058169 | A1* | 2/2020 | Friesenhahn | G01C 21/1656 |
| 2021/0344831 | A1* | 11/2021 | Vilermo | H04N 23/67 |
| 2021/0375049 | A1* | 12/2021 | Syed | G06T 19/006 |
| 2021/0400417 | A1* | 12/2021 | Freeman | H04S 7/306 |
| 2022/0028108 | A1* | 1/2022 | Haapoja | G06Q 30/0643 |

(Continued)

FOREIGN PATENT DOCUMENTS

| CN | 110999328 A | * | 4/2020 | | G06F 3/012 |
| CN | 110089131 B | * | 7/2021 | | G10L 21/02 |

(Continued)

OTHER PUBLICATIONS

Azizyan et al, "SurroundSense: Mobile Phone Localization via Ambience Fingerprinting". 12 pages. (Year: 2009).*

*Primary Examiner* — Qin Zhu
(74) *Attorney, Agent, or Firm* — Fenwick & West LLP

(57) ABSTRACT

A reference image and recorded sound of an environment of a client device are obtained. The recorded sound may be captured by a microphone of the client device in a period of time after generation of a localization sound by the client device. The location of the client device in the environment may be determined using the reference image and the recorded sound.

20 Claims, 9 Drawing Sheets

(56) References Cited

U.S. PATENT DOCUMENTS

| | | | | |
|---|---|---|---|---|
| 2023/0011087 A1 | * | 1/2023 | Mekler | H04R 3/005 |
| 2024/0398498 A1 | * | 12/2024 | Seyed Vahedein | G16H 40/40 |

FOREIGN PATENT DOCUMENTS

| | | | | | |
|---|---|---|---|---|---|
| EP | 3400705 B1 | * | 3/2021 | | G01S 3/80 |
| GB | 2606650 A | * | 11/2022 | | G06T 19/006 |
| WO | WO-2018042770 A1 | * | 3/2018 | | G06T 3/0018 |
| WO | WO-2023229600 A1 | * | 11/2023 | | G06T 7/579 |

* cited by examiner (a) Audio-visual inputs

LOCALIZATION USING AUDIO AND VISUAL DATA

CROSS REFERENCE TO RELATED APPLICATIONS

This application claims the benefit of U.S. Provisional Application No. 63/355,086, filed Jun. 23, 2022, which is incorporated by reference.

BACKGROUND

1 Technical Field

The subject matter described relates generally to localization, and, in particular, to localizing using a combination of visual and audio data.

2. Problem

Determining the location and orientation (collectively "pose") of a camera that captured an image unlocks a wide array of options for providing functionality and content to users. The process of determining pose may be referred to as localization. Existing approaches to localization compare one or more images captured by a camera to a pre-existing 3D map of the scene to match the features shown in the image to the map. Thus, the pose of the camera may be determined, often with an accuracy of a few centimeters or better. However, such approaches are hampered in low-light conditions (e.g., at night) and in other scenarios where matching visual data to a 3D map is challenging. Thus, there is a need for localization approaches that supplement or replace visual data with other information sources.

SUMMARY

The present disclosure describes an approach to localization that makes use of audio data to supplement or replace visual data. In some embodiments, one or more reference images of a scene are captured (e.g., by a device to be localized) and supplemented by echolocation data. The echolocation data may be generated by the device emitting a sound (e.g., a chirp or audio pulse) and detecting reflections of the sound from surrounding surfaces using one or more microphones. The pose of the device may be determined from a combination of information derived from the reference image(s) and information about surrounding surfaces derived from the echolocation data. The echolocation data may include information from parts of the scene that are outside of the field of view of the camera that captured the reference image(s). The use of echolocation data may be particularly useful in low light conditions and other scenarios where localizing based on visual data alone is challenging.

In one embodiment, the system obtains a reference image of an environment of a client device and obtains recorded sound of the environment of the client device. The recorded sound is captured by a microphone of the client device in a period of time after generation of a localization sound by the client device. The system then determines a location of the client device in the environment using the reference image and the recorded sound.

The system may obtain a second recorded sound. The second recorded sound is a recorded sound of the environment captured by a second microphone in the period of time after generation of the localization sound by the second client device. The system then determines a location of the second microphone relative to the location of the client device in the environment using the second recorded sound.

In some embodiments, the system obtains a second reference image of the environment based on a second client device; and determines a location of the second client device relative to the location of the client device in the environment using the second recorded sound and the second reference image. The system may query an audio-visual database based on the reference image of the environment and the recorded sound; determines the location of the client device based on query of the audio-visual database. The location of the client device may include a description of an orientation of the client device with respect to the environment.

In some embodiments, the client device that captures the reference image and recorded sounds provides them to a server and the server determines the location of the client device in the environment using the reference image and the recorded sound. The server may provide the location to the client device. Alternatively, the client device may determine its own location in the environment based on the reference image and recorded sound.

DETAILED DESCRIPTION

The figures and the following description describe certain embodiments by way of illustration only. One skilled in the art will recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Various embodiments are described in the context of a parallel reality game that includes augmented reality content in a virtual world geography that parallels at least a portion of the real-world geography such that player movement and actions in the real-world affect actions in the virtual world. The subject matter described is applicable in other situations where device localization is desirable. In addition, the inherent flexibility of computer-based systems allows for a great variety of possible configurations, combinations, and divisions of tasks and functionality between and among the components of the system.

Example Location-Based Parallel Reality Game

Figure 1:
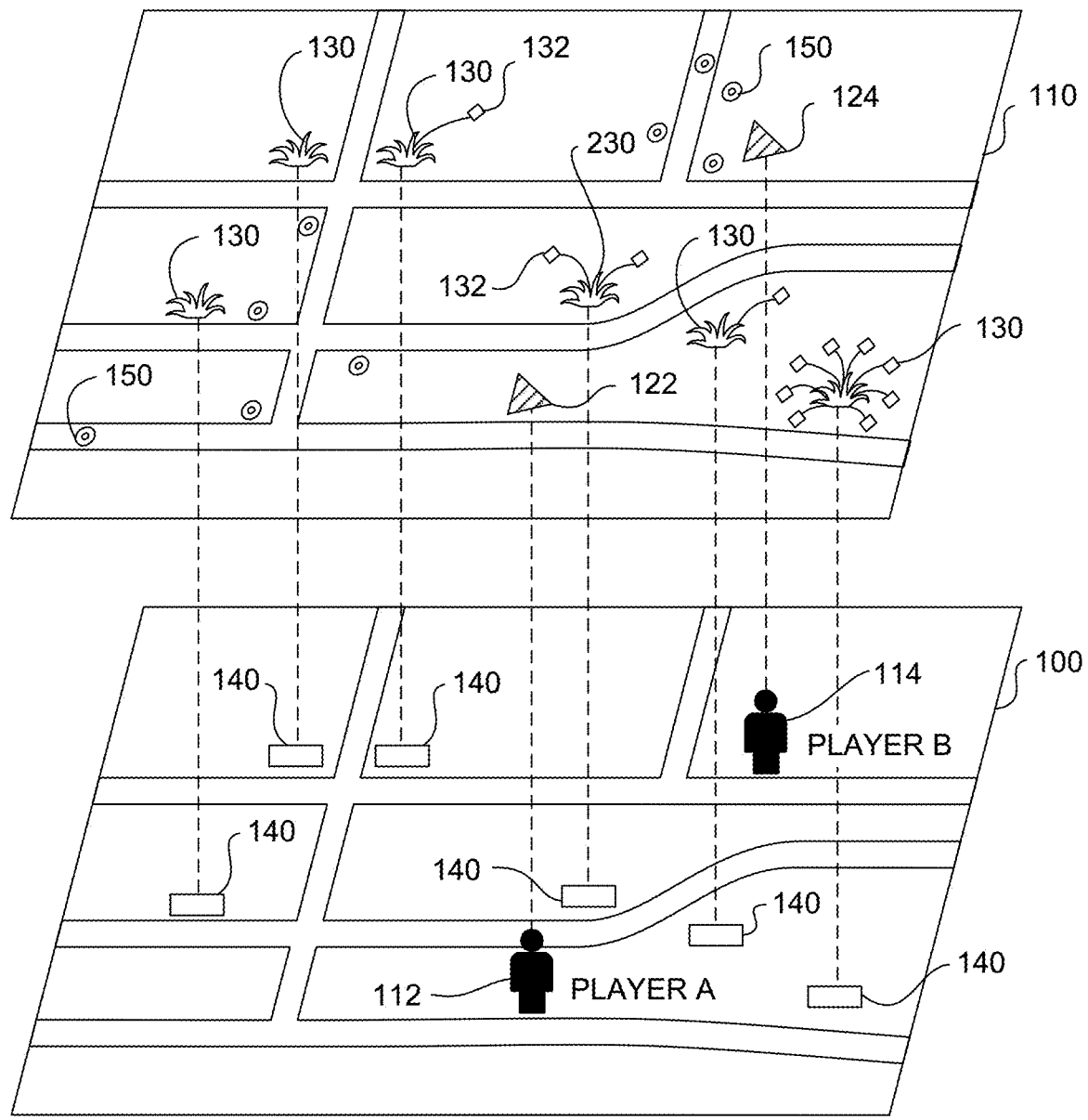
FIG. 1 depicts a representation of a virtual world having a geography that parallels the real world, according to one embodiment.

FIG. 1 is a conceptual diagram of a virtual world 110 that parallels the real world 100. The virtual world 110 can act as the game board for players of a parallel reality game. As illustrated, the virtual world 110 includes a geography that parallels the geography of the real world 100. In particular, a range of coordinates defining a geographic area or space in the real world 100 is mapped to a corresponding range of coordinates defining a virtual space in the virtual world 110. The range of coordinates in the real world 100 can be associated with a town, neighborhood, city, campus, locale, a country, continent, the entire globe, or other geographic area. Each geographic coordinate in the range of geographic coordinates is mapped to a corresponding coordinate in a virtual space in the virtual world 110.

A player's position in the virtual world 110 corresponds to the player's position in the real world 100. For instance, player A located at position 112 in the real world 100 has a corresponding position 122 in the virtual world 110. Similarly, player B located at position 114 in the real world 100 has a corresponding position 124 in the virtual world 110. As the players move about in a range of geographic coordinates in the real world 100, the players also move about in the range of coordinates defining the virtual space in the virtual world 110. In particular, a positioning system (e.g., a GPS system) associated with a mobile computing device carried by the player can be used to track a player's position as the player navigates the range of geographic coordinates in the real world 100. Data associated with the player's position in the real world 100 is used to update the player's position in the corresponding range of coordinates defining the virtual space in the virtual world 110. In this manner, players can navigate along a continuous track in the range of coordinates defining the virtual space in the virtual world 110 by simply traveling among the corresponding range of geographic coordinates in the real world 100 without having to check in or periodically update location information at specific discrete locations in the real world 100.

The location-based game can include game objectives requiring players to travel to or interact with various virtual elements or virtual objects scattered at various virtual locations in the virtual world 110. A player can travel to these virtual locations by traveling to the corresponding location of the virtual elements or objects in the real world 100. For instance, a positioning system can track the position of the player such that as the player navigates the real world 100, the player also navigates the parallel virtual world 110. The player can then interact with various virtual elements and objects at the specific location to achieve or perform one or more game objectives.

A game objective may have players interacting with virtual elements 130 located at various virtual locations in the virtual world 110. These virtual elements 130 can be linked to landmarks, geographic locations, or objects 140 in the real world 100. The real-world landmarks or objects 140 can be works of art, monuments, buildings, businesses, libraries, museums, or other suitable real-world landmarks or objects. Interactions include capturing, claiming ownership of, using some virtual item, spending some virtual currency, etc. To capture these virtual elements 130, a player travels to the landmark or geographic locations 140 linked to the virtual elements 130 in the real world and performs any necessary interactions (as defined by the game's rules) with the virtual elements 130 in the virtual world 110. For example, player A 112 may have to travel to a landmark 140 in the real world 100 to interact with or capture a virtual element 130 linked with that particular landmark 140. The interaction with the virtual element 130 can require action in the real world, such as taking a photograph or verifying, obtaining, or capturing other information about the landmark or object 140 associated with the virtual element 130.

Game objectives may require that players use one or more virtual items that are collected by the players in the location-based game. For instance, the players may travel the virtual world 110 seeking virtual items 132 (e.g., weapons, creatures, power ups, or other items) that can be useful for completing game objectives. These virtual items 132 can be found or collected by traveling to different locations in the real world 100 or by completing various actions in either the virtual world 110 or the real world 100 (such as interacting with virtual elements 130, battling non-player characters or other players, or completing quests, etc.). In the example shown in FIG. 1, a player uses virtual items 132 to capture one or more virtual elements 130. In particular, a player can deploy virtual items 132 at locations in the virtual world 110 near to or within the virtual elements 130. Deploying one or more virtual items 132 in this manner can result in the capture of the virtual element 130 for the player or for the team/faction of the player.

In one particular implementation, a player may have to gather virtual energy as part of the parallel reality game. Virtual energy 150 can be scattered at different locations in the virtual world 110. A player can collect the virtual energy 150 by traveling to (or within a threshold distance of) the location in the real world 100 that corresponds to the location of the virtual energy in the virtual world 110. The virtual energy 150 can be used to power virtual items or perform various game objectives in the game. A player that loses all virtual energy 150 may be disconnected from the game or prevented from playing for a certain amount of time or until they have collected additional virtual energy 150.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing their locations.

Figure 2:
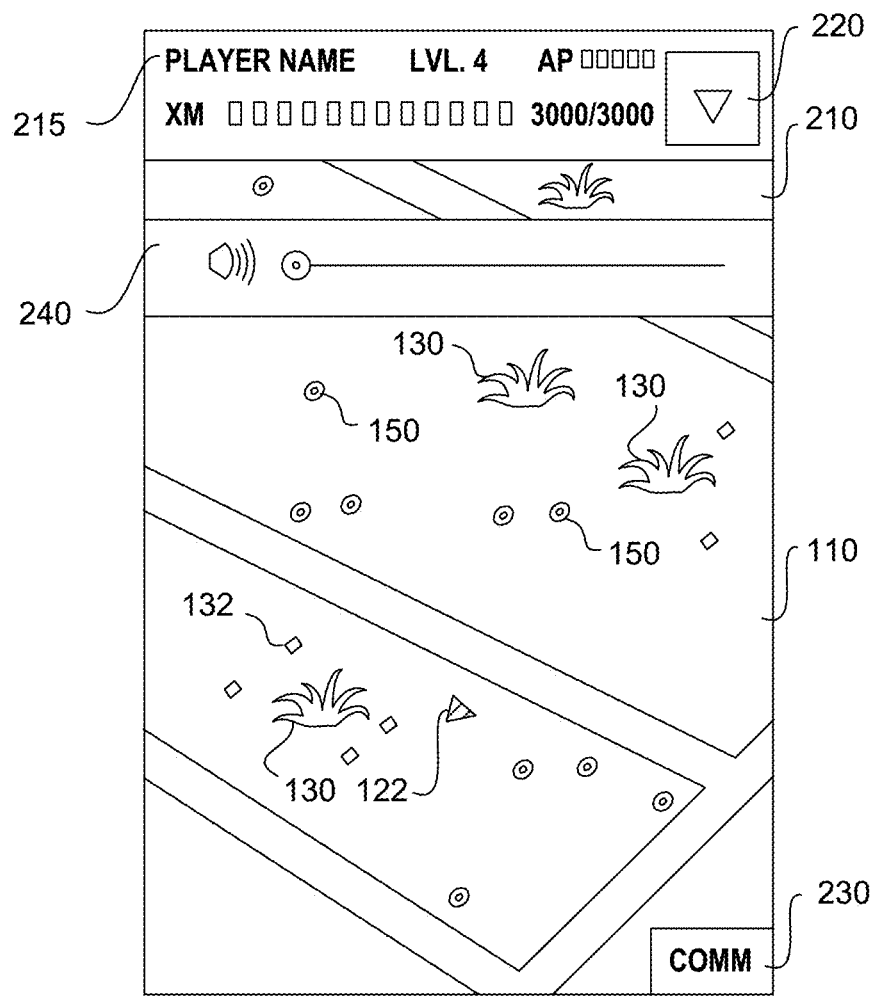
FIG. 2 depicts an exemplary game interface of a parallel reality game, according to one embodiment.

FIG. 2 depicts one embodiment of a game interface 200 that can be presented (e.g., on a player's smartphone) as part of the interface between the player and the virtual world 110. The game interface 200 includes a display window 210 that can be used to display the virtual world 110 and various other aspects of the game, such as player position 122 and the locations of virtual elements 130, virtual items 132, and virtual energy 150 in the virtual world 110. The user interface 200 can also display other information, such as game data information, game communications, player information, client location verification instructions and other information associated with the game. For example, the user interface can display player information 215, such as player name, experience level, and other information. The user interface 200 can include a menu 220 for accessing various game settings and other information associated with the game. The user interface 200 can also include a communications interface 230 that enables communications between the game system and the player and between one or more players of the parallel reality game.

According to aspects of the present disclosure, a player can interact with the parallel reality game by carrying a client device around in the real world. For instance, a player can play the game by accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 200 can include non-visual elements that allow a user to interact with the game. For instance, the game interface can provide audible notifications to the player when the player is approaching a virtual element or object in the game or when an important event happens in the parallel reality game. In some embodiments, a player can control these audible notifications with audio control 240. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. Players may also be able to obtain enhanced "powers" or virtual items that can be used to complete game objectives within the game.

Those of ordinary skill in the art, using the disclosures provided, will appreciate that numerous game interface configurations and underlying functionalities are possible. The present disclosure is not intended to be limited to any one particular configuration unless it is explicitly stated to the contrary.

Example Gaming System

Figure 3:
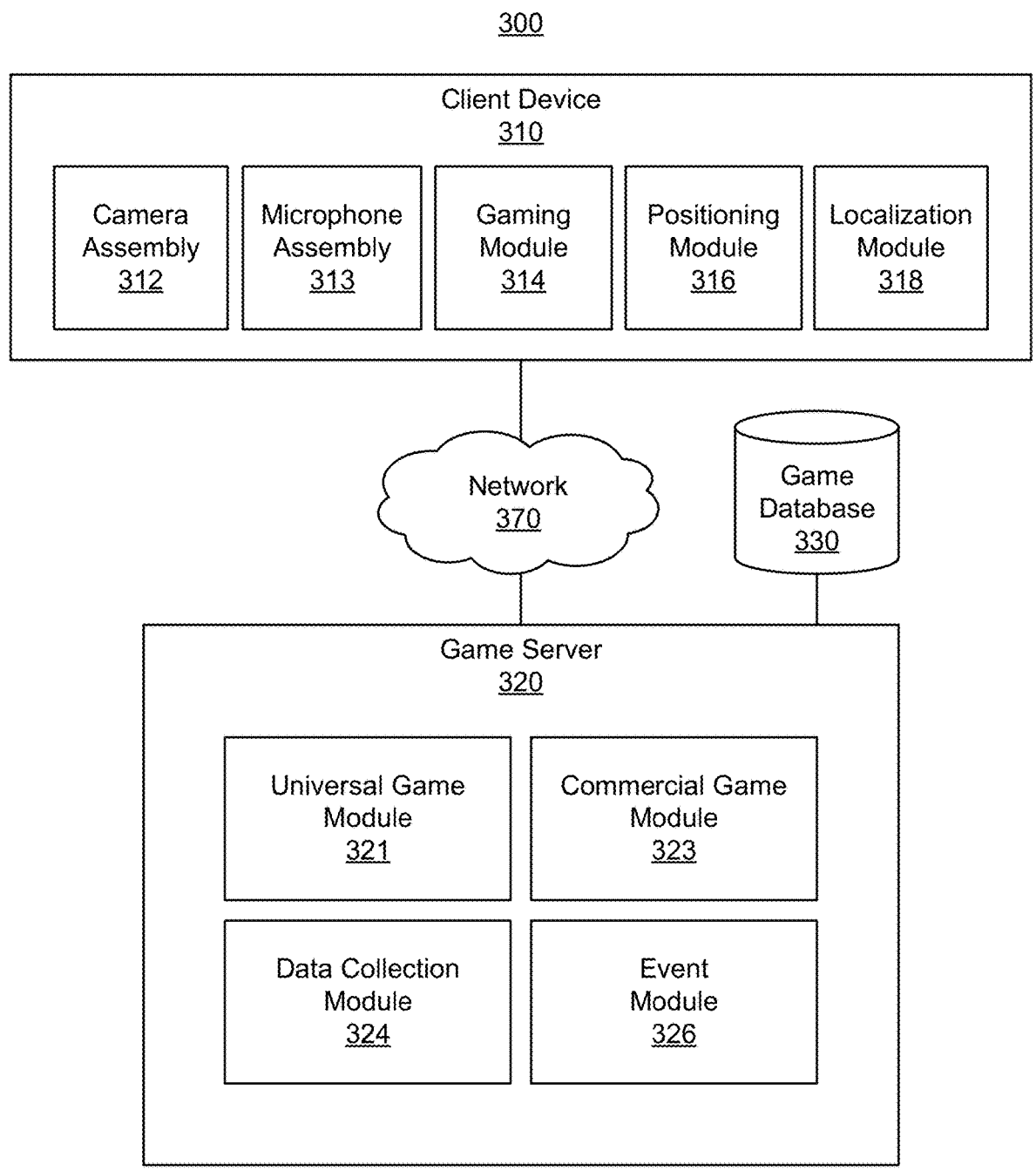
FIG. 3 is a block diagram of a networked computing environment suitable for providing localization using audio data, according to one embodiment.

FIG. 3 illustrates one embodiment of a networked computing environment 300. The networked computing environment 300 uses a client-server architecture, where a game server 320 communicates with a client device 310 over a network 370 to provide a parallel reality game to a player at the client device 310. The networked computing environment 300 also may include other external systems such as sponsor/advertiser systems or business systems. Although only one client device 310 is shown in FIG. 3, any number of client devices 310 or other external systems may be connected to the game server 320 over the network 370. Furthermore, the networked computing environment 300 may contain different or additional elements and functionality may be distributed between the client device 310 and the server 320 in different manners than described below.

The networked computing environment 300 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 310 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 310.

A client device 310 can be any portable computing device capable for use by a player to interface with the game server 320. For instance, a client device 310 is preferably a portable wireless device that can be carried by a player, such as a smartphone, portable gaming device, augmented reality (AR) headset, cellular phone, tablet, personal digital assistant (PDA), navigation system, handheld GPS system, or other such device. For some use cases, the client device 310 may be a less-mobile device such as a desktop or a laptop computer. Furthermore, the client device 310 may be a vehicle with a built-in computing device.

The client device 310 communicates with the game server 320 to provide sensory data of a physical environment. In one embodiment, the client device 310 includes a camera assembly 312, a microphone assembly 313, a gaming module 314, positioning module 316, and localization module 318. The client device 310 also includes a network interface (not shown) for providing communications over the network 370. In various embodiments, the client device 310 may include different or additional components, such as additional sensors, display, and software modules, etc.

The camera assembly 312 includes one or more cameras which can capture image data. The cameras capture image data describing a scene of the environment surrounding the client device 310 with a particular pose (the location and orientation of the camera within the environment). The camera assembly 312 may use a variety of photo sensors with varying color capture ranges and varying capture rates. Similarly, the camera assembly 312 may include cameras with a range of different lenses, such as a wide-angle lens or a telephoto lens. The camera assembly 312 may be configured to capture single images or multiple images as frames of a video.

The microphone assembly 313 includes one or more microphones which can capture audio data representing sound waves in the environment surrounding the client device 310. The microphone assembly 313 may use a variety of audio capture technologies, such as microphones based on condensers, moving coils, diaphragms, ribbons, piezoelectric elements, MEM sensors, or the like. The microphones may have various frequency sensitivity ranges and profiles. The microphone assembly 113 may also include one or more audio signal generators (e.g., speakers) for generating sound (e.g., for use in echolocation).

The client device 310 may also include additional sensors for collecting data regarding the environment surrounding the client device, such as movement sensors, accelerometers, gyroscopes, barometers, thermometers, light sensors, microphones, etc. The image data captured by the camera assembly 312 can be appended with metadata describing other information about the image data, such as additional sensory data (e.g., temperature, brightness of environment, air pressure, location, pose etc.) or capture data (e.g., exposure length, shutter speed, focal length, capture time, etc.).

The gaming module 314 provides a player with an interface to participate in the parallel reality game. The game server 320 transmits game data over the network 370 to the client device 310 for use by the gaming module 314 to provide a local version of the game to a player at locations remote from the game server. In one embodiment, the gaming module 314 presents a user interface on a display of the client device 310 that depicts a virtual world (e.g., renders imagery of the virtual world) and allows a user to interact with the virtual world to perform various game objectives. In some embodiments, the gaming module 314 presents images of the real world (e.g., captured by the camera assembly 312) augmented with virtual elements from the parallel reality game. In these embodiments, the gaming module 314 may generate or adjust virtual content according to other information received from other components of the client device 310. For example, the gaming module 314 may adjust a virtual object to be displayed on the user interface according to a depth map of the scene captured in the image data.

The gaming module 314 can also control various other outputs to allow a player to interact with the game without requiring the player to view a display screen. For instance, the gaming module 314 can control various audio, vibratory, or other notifications that allow the player to play the game without looking at the display screen.

The positioning module 316 can be any device or circuitry for determining the position of the client device 310. For example, the positioning module 316 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, IP address analysis, triangulation and/or proximity to cellular towers or Wi-Fi hotspots, or other suitable techniques.

As the player moves around with the client device 310 in the real world, the positioning module 316 tracks the position of the player and provides the player position information to the gaming module 314. The gaming module 314 updates the player position in the virtual world associated with the game based on the actual position of the player in the real world. Thus, a player can interact with the virtual world simply by carrying or transporting the client device 310 in the real world. In particular, the location of the player in the virtual world can correspond to the location of the player in the real world. The gaming module 314 can provide player position information to the game server 320 over the network 370. In response, the game server 320 may enact various techniques to verify the location of the client device 310 to prevent cheaters from spoofing their locations.

It should be understood that location information associated with a player is utilized only if permission is granted after the player has been notified that location information of the player is to be accessed and how the location information is to be utilized in the context of the game (e.g., to update player position in the virtual world). In addition, any location information associated with players is stored and maintained in a manner to protect player privacy.

In contrast to the positioning module 316, which determine geographic coordinates of the client device 310, the localization module 318 determines the pose of one or more cameras of the camera assembly 312 within the client device's immediate environment. In one embodiment, the localization module 318 receives a single image of the environment of the client device 310 and uses that single image as a reference image. In other embodiments, the localization module 318 may receive multiple images (e.g., a set of five or ten images) of the environment to use as reference images.

The localization module 318 determines the pose of the client device 310 from sensor data. The sensor data may include one or more audio signals generated by the microphone assembly 313, one or more reference images captured by the camera assembly 312, or both. The localization module 318 may also use additional data captured by other sensors, such as magnetometers, barometers, humidity sensors, or the like.

In one embodiment, the client device generates one or more sounds and the microphone assembly 313 captures one or more reflections of the sound from surfaces in the environment and generates corresponding audio signals. Thus, echolocation techniques can be applied to the audio signals to extract information about the location of surfaces in the environment, which can be used to disambiguate possible locations for the client device 310 determined by comparing the reference image(s) to a 3D map of the environment. These techniques may include machine learning models. Various embodiments of the localization module 318 and additional details of providing localization using a combination of audio and visual data are described further in FIGS. 4, 5A, 5B, 5C, and 6. Although the localization module 318 is shown as part of the client device 310, it may alternatively be hosted on game server 320 with the sensor data captured by microphone assembly 313 and camera assembly 312 being provided to game server 320 for localization via the network 370.

One or more machine learning models may be applied to the sensor data for localization. Example machine learning models include regression models, random forests, neural networks, and the like. The machine learning model used by the localization module 318 may be pre-trained by a separate entity from the entity responsible for localization module 318. Additionally, or alternatively, a machine-learning training module of the game server 320 may train or refine parameters of the machine learning model based on data specific to the networked computing environment 300 stored in the data collection module 324. As an example, the machine-learning training module may obtain a pre-trained neural network and further fine tune the parameters of the neural network using training data gathered by the data collection module 324. The machine-learning training module may then provide the trained model to localization module 318 for deployment.

In some embodiments, a machine learning model in localization module 318 is pre-trained by converting an egocentric depth cube map into an audio representation, and providing audio-visual samples whether the camera assembly is rotated with respect to the microphone assembly, to train the machine learning model to reconstruct the egocentric depth cube map view from the audio. In some embodiments, the machine learning models hosted in localization module 318 are trained on datasets containing a variety of example environments. For example, a machine learning model may be trained on a dataset of indoor scenes such as hotels, apartments, rooms, and offices.

The game server 320 includes one or more computing devices that provide game functionality to the client device 310. The game server 320 can include or be in communication with a game database 330. The game database 330 stores game data used in the parallel reality game to be served or provided to the client device 310 over the network 370.

The game data stored in the game database 330 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); or (8) any other data used, related to, or obtained during implementation of the parallel reality game. The game data stored in the game database 330 can be populated either offline or in real time by system administrators or by data received from users (e.g., players) of the system 300, such as from a client device 310 over the network 370.

In one embodiment, the game server 320 is configured to receive requests for game data from a client device 310 (for instance via remote procedure calls (RPCs)) and to respond to those requests via the network 370. The game server 320 can encode game data in one or more data files and provide the data files to the client device 310. In addition, the game server 320 can be configured to receive game data (e.g., player positions, player actions, player input, etc.) from a client device 310 via the network 370. The client device 310 can be configured to periodically send player input and other updates to the game server 320, which the game server uses to update game data in the game database 330 to reflect any and all changed conditions for the game.

In the embodiment shown in FIG. 3, the game server 320 includes a universal gaming module 322, a commercial game module 323, a data collection module 324, and an event module 326. As mentioned above, the game server 320 interacts with a game database 330 that may be part of the game server or accessed remotely (e.g., the game database 330 may be a distributed database accessed via the network 370). In other embodiments, the game server 320 contains different or additional elements. In addition, the functions may be distributed among the elements in a different manner than described.

The universal game module 322 hosts an instance of the parallel reality game for a set of players (e.g., all players of the parallel reality game) and acts as the authoritative source for the current status of the parallel reality game for the set of players. As the host, the universal game module 322 generates game content for presentation to players (e.g., via their respective client devices 310). The universal game module 322 may access the game database 330 to retrieve or store game data when hosting the parallel reality game. The universal game module 322 may also receive game data from client devices 310 (e.g., depth information, player input, player position, player actions, landmark information, etc.) and incorporates the game data received into the overall parallel reality game for the entire set of players of the parallel reality game. The universal game module 322 can also manage the delivery of game data to the client device 310 over the network 370. In some embodiments, the universal game module 322 also governs security aspects of the interaction of the client device 310 with the parallel reality game, such as securing connections between the client device and the game server 320, establishing connections between various client devices, or verifying the location of the various client devices 310 to prevent players cheating by spoofing their location.

The commercial game module 323 can be separate from or a part of the universal game module 322. The commercial game module 323 can manage the inclusion of various game features within the parallel reality game that are linked with a commercial activity in the real world. For instance, the commercial game module 323 can receive requests from external systems such as sponsors/advertisers, businesses, or other entities over the network 370 to include game features linked with commercial activity in the real world. The commercial game module 323 can then arrange for the inclusion of these game features in the parallel reality game on confirming the linked commercial activity has occurred. For example, if a business pays the provider of the parallel reality game an agreed upon amount, a virtual object identifying the business may appear in the parallel reality game at a virtual location corresponding to a real-world location of the business (e.g., a store or restaurant).

The data collection module 324 can be separate from or a part of the universal game module 322. The data collection module 324 can manage the inclusion of various game features within the parallel reality game that are linked with a data collection activity in the real world. For instance, the data collection module 324 can modify game data stored in the game database 330 to include game features linked with data collection activity in the parallel reality game. The data collection module 324 can also analyze and data collected by players pursuant to the data collection activity and provide the data for access by various platforms.

The event module 326 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The network 370 can be any type of communications network, such as a local area network (e.g., intranet), wide area network (e.g., Internet), or some combination thereof. The network can also include a direct connection between a client device 310 and the game server 320. In general, communication between the game server 320 and a client device 310 can be carried via a network interface using any type of wired or wireless connection, using a variety of communication protocols (e.g., TCP/IP, HTTP, SMTP, FTP), encodings or formats (e.g., HTML, XML, JSON), or protection schemes (e.g., VPN, secure HTTP, SSL).

This disclosure makes reference to servers, databases, software applications, and other computer-based systems, as well as actions taken, and information sent to and from such systems. One of ordinary skill in the art will recognize that the inherent flexibility of computer-based systems allows for a great variety of possible configurations, combinations, and divisions of tasks and functionality between and among components. For instance, processes disclosed as being implemented by a server may be implemented using a single server or multiple servers working in combination. Databases and applications may be implemented on a single system or distributed across multiple systems. Distributed components may operate sequentially or in parallel.

In situations in which the systems and methods disclosed access and analyze personal information about users, or make use of personal information, such as location information, the users may be provided with an opportunity to control whether programs or features collect the information and control whether or how to receive content from the system or other application. This personal information also includes recorded sounds and reference images that may be taken of the user's location. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Figure 4:
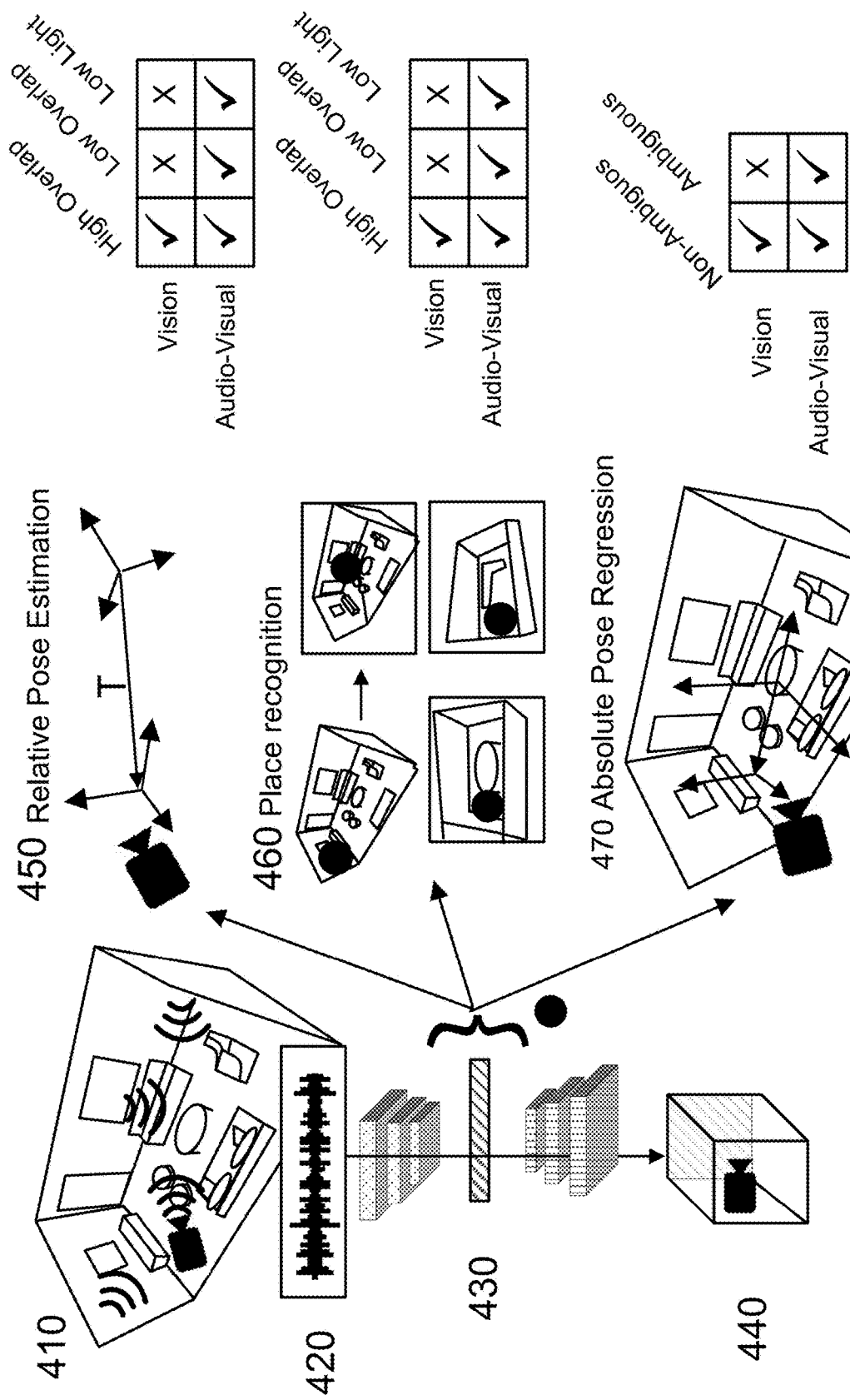
FIG. 4 is a block diagram of a method for providing various forms of localization using audio data, according to one embodiment.

FIG. 4 is a block diagram of one embodiment of a method for providing various forms of localization using audio data. Alternative embodiments may include more, fewer, or different steps from those illustrated in FIG. 4, and the steps may be performed in a different order from that illustrated in FIG. 4. These steps may be performed by the localization module 318, which may be hosted on the client device 310, by the game server 320, or by any other device in networked computing environment 300. Additionally, each of these steps may be performed automatically by the localization module 318 without human intervention.

In one embodiment, the localization module 318 obtains audio-visual input 420 of the environment 410 of the client device 310, the audio-visual input 420 including a reference image and recorded sound. Alternatively, the audio-visual input 420 is recorded sound only. The recorded sound is captured by a microphone assembly 313 of the client device 310 in a time period after generation of a localization sound by the client device 310. The reference image of environment 410 is captured by camera assembly 312 of client device 310. The client device 310, including a microphone assembly 313 and camera assembly 312 in environment 410, records the sound by generating a sound that reflects from surfaces to create echoes. Combining audio and visual input for audio-visual input 420 may capture more scene information than is available from images alone. For example, audio input may capture reflections from surfaces outside the view of camera assembly 312, and are unaffected by conditions such as low lighting.

The localization module 318 processes audio-visual input 420 to create an intermediate representation 430 which brings together the inputs to represent the perceived space, as well as egocentric depth cube map 440. In some embodiments, intermediate representation 430 is generated based on recorded sound only. Localization module 318 processes the intermediate representation 430 and to determine the location of environment 410. The format of the location may be as a relative pose estimation 450, a place recognition 460, or an absolute pose estimation 470. The localization module 318 may process the intermediate representation 430 through the use of machine learning models such as one or more neural networks.

Relative Pose Estimation

Relative pose estimation is used to localize one device with respect to another by predicting the relative transformation between them, usually based on a pair of images. Localization module 318 processes the audio inputs from two client devices to determine the relative pose of one client device relative to the other. Localization module 318 may process the audio input using audio-input only, or in combination with visual inputs as well.

The localization module 318 provides the recorded sounds of a first device client device to a feature extractor to extract the key features of the recorded sound for future processing. The feature extractor generates an embedding which is a vector that includes the extracted features. The extracted features are concatenated and provided to a machine learning model which outputs vectors. The feature extractor is pre-trained based on previous datasets. The output from the feature extractor is provided to a neural network model. For example, the output from the feature extractor may be provided to a shallow multi-layer perceptron (MLP) which takes as input concatenated features and produces vectors as output. Further processing, such as for example, a partial Gram-Schmidt projection, transforms the vectors into a rotation matrix representing the relative position between the two client devices.

The reference images and the recorded sounds may be processed by separate machine learning models and then provided to a gating network to determine the best predicted pose result in order to take advantage of machine learning models optimized for visual input, such as SuperGlue. The output of the separate machine learning models are both provided to a gating function to determine the final predicted pose. A gating function is a filtering mechanism to filter out a plurality of results to determine the best results. The gating function is a neural network machine learning model. In one embodiment, the gating function may determine that either predictions based on either the audio or visual input is more reliable and adjust the weight accordingly.

Figure 5A:
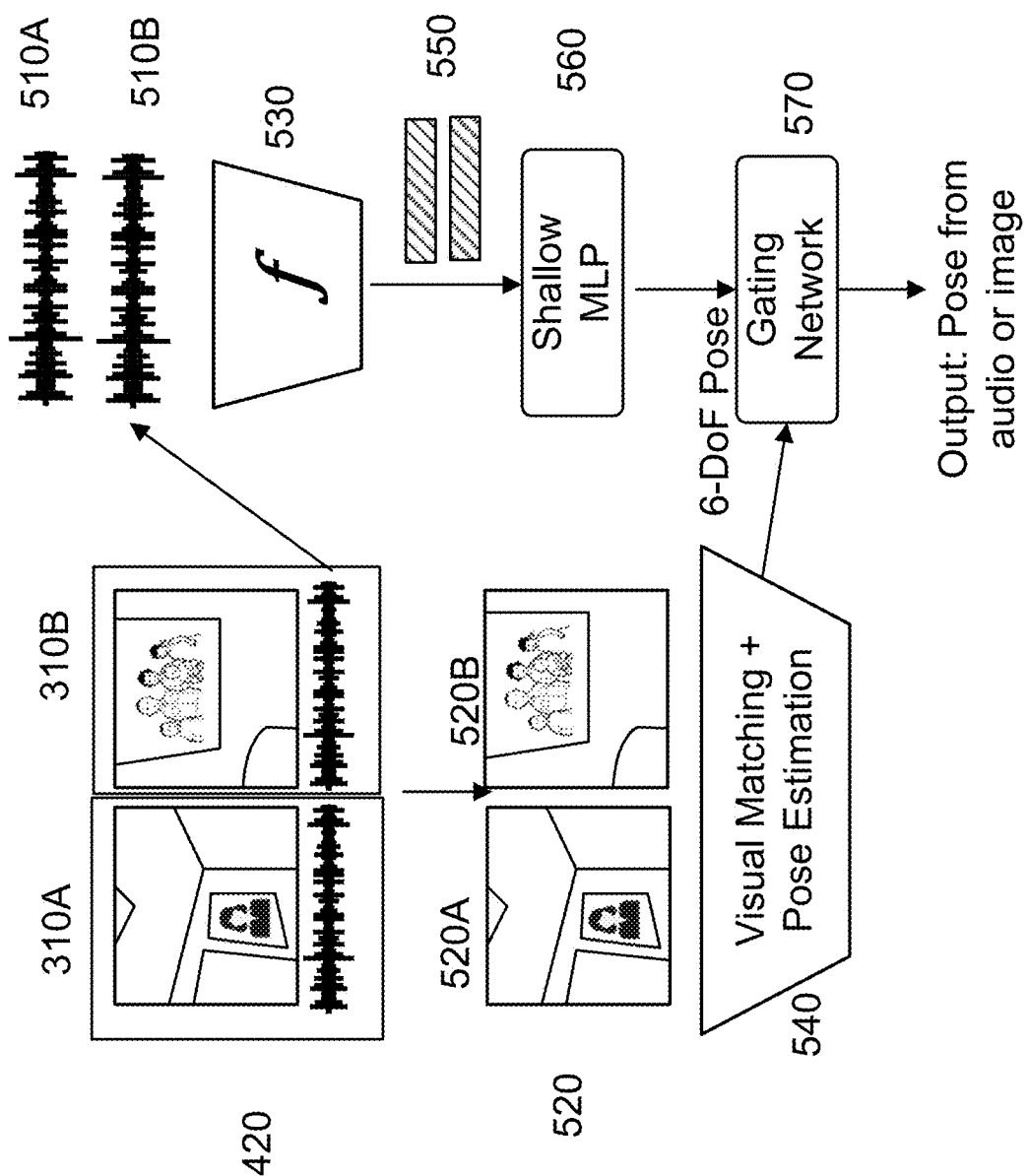
FIG. 5A is a block diagram of a method for relative pose estimation using audio data, according to one embodiment.

FIG. 5A is a block diagram of one embodiment of a method for relative pose estimation using audio data. Alternative embodiments may include more, fewer, or different steps from those illustrated in FIG. 5A, and the steps may be performed in a different order from that illustrated in FIG.

5A. These steps may be performed by the localization module 318, which may be hosted on the client device 310, by the game server 320, or by any other device in networked computing environment 300. Additionally, each of these steps may be performed automatically by the localization module 318 without human intervention. The relative pose estimation is determined as the location of one client device relative to a second client device. In some embodiments, both of the client devices are the same client device, but the second client device is the client device at a later point in time. In these embodiments, the relative pose location is determining the relative pose of the client device relative to a past location.

In the embodiment shown, the localization module 318 obtains audio-visual input 420 of an environment 410 of the client device 310, the audio-visual input 420 including a reference image 520 and recorded sound 510. The localization module 318 obtains a first reference image 520A of the environment 410 of the client device 310 and obtains first recorded sound 510A of the environment 410 of the first client device 310A. The first recorded sound 510A is captured by a microphone assembly 313 of the first client device 310A in a period of time after generation of a localization sound by the first client device 310A. The reference image 520A is captured by camera assembly 312 on first client device 310A. The localization module 318 obtains a second recorded sound 510B, and a second reference image 520B of the environment 410 based on a second client device 310B. The second recorded sound 510B is a recorded sound of the environment 410 captured by a microphone assembly 313 in the time period after generation of the localization sound by the second client device 310B. The second reference image 520B is captured by a camera assembly 312 on second client device 310B.

The localization module 318 determines a location of the second client device 310B relative to the location of the first client device 310A in the environment 410 using the first reference image 520A, the first recorded sound 510A, the second recorded sound 510B and the second reference image 520B. Additionally or alternatively, the localization module 318 may determine the location of the first client device 310A relative to the second client device 310B.

The localization module 318 receives the recorded sounds 510 and reference images 520 from the client devices 310. Localization module 318 provides the recorded sounds 510 to feature extractor 530, which generates an embedding 550, the embedding being a vector that includes the extracted features. Localization module provides the embedding 550 to a Shallow MLP 560 which outputs candidate poses with 6 six degrees of freedom. Localization module 318 provides the reference images 520 to a visual matching model 540 which produces candidate poses with six degrees of freedom based on the visual information. An example of such a visual matching model 540 may be SuperGlue. The candidate poses are provided to gating network 570, a neural network model which outputs a final relative pose estimation 450. The feature extractor 530, Shallow MLP 560, and visual matching model 540, along with the gating network 570, together form a neural network model. The gating network 570 is a neural network that takes in the candidate poses from both the Shallow MLP 560 and the visual matching model 540 and outputs the selected candidate pose as the relative pose estimation 450. The gating network 570 is trained to optimize the combination of the expert outputs.

In an alternate embodiment, the combination the feature extractor 530, Shallow MLP 560, and visual matching model 540 may form the mixture-of-experts type model without a gating network 570, and instead use an intuitive gating function based on the validation step for the visual matching from the visual matching model 540. For example, if the visual matching model 540 produces a pose, then there is likely an overlap between the images and the visual-based resulting pose is used. Otherwise, the pose based on the Shallow MLP 560 will be used.

Place Recognition

Visual place recognition typically involves performing retrieval on camera inputs, but can perform poorly in situations with low overlap between query and database images. The benefits of including audio inputs include helping to provide spatial cubes beyond the camera's field of view. Localization module 318 processes the audio inputs from a client device, and compares the recorded sound to a nearest neighbor result from a database with a known location. The comparison of the recorded sound and the matching result from the database determines the place recognition result. Localization module 318 may process the audio input using audio-input only, or in combination with visual inputs as well.

The localization module 318 provides the recorded sounds of a client device to a feature extractor to extract the key features of the recorded sound for future processing. The feature extractor generates an embedding which is a vector that includes the extracted features. The extracted features are concatenated and provided to a machine learning model which outputs an audio descriptor. The feature extractor is pre-trained based on previous datasets. The output from the feature extractor is provided to a neural network model. For example, the output from the feature extractor may be provided to a shallow multi-layer perceptron which takes as input concatenated features and produces an audio descriptor as output. To perform place recognition, localization module 318 compares the output audio descriptors to the descriptors from a reference database. For example, the localization module 318 may compare the output audio descriptors to the descriptors from the reference database using an exact nearest neighbor search based on Euclidean distance.

The reference images and the recorded sounds may be processed by separate machine learning models and then provided to a gating network to determine the best predicted pose result in order to take advantage of machine learning models optimized for visual input, such as NetVLAD. The output of the separate machine learning models are both provided to a gating function to determine the final place recognition determination.

Figure 5B:
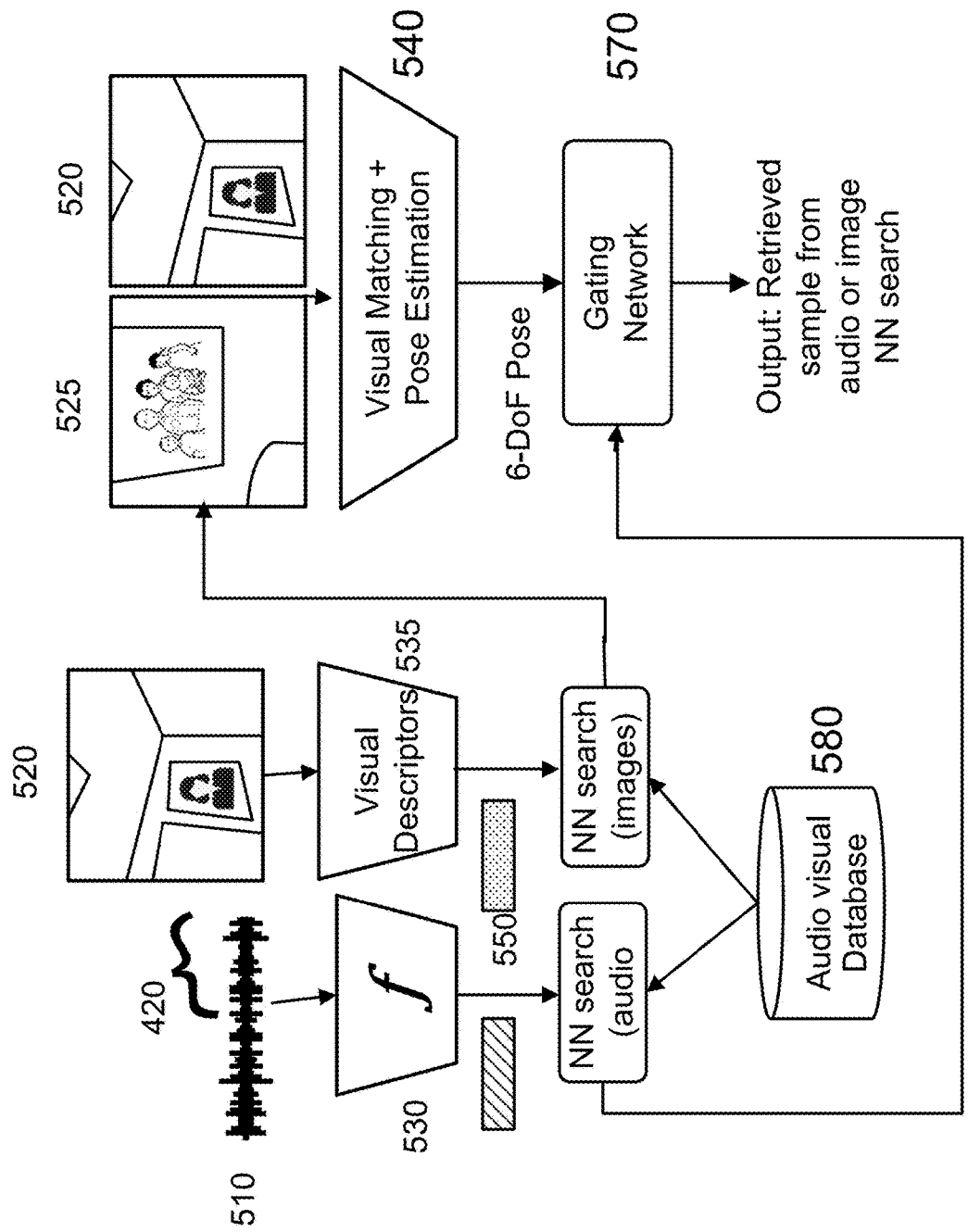
FIG. 5B is a block diagram of a method for place recognition using audio data, according to one embodiment.

FIG. 5B is a block diagram of one embodiment of a method for place recognition using audio data. Alternative embodiments may include more, fewer, or different steps from those illustrated in FIG. 5B, and the steps may be performed in a different order from that illustrated in FIG. 5B. These steps may be performed by the localization module 318, which may be hosted on the client device 310, by the game server 320, or by any other device in networked computing environment 300. Additionally, each of these steps may be performed automatically by the localization module 318 without human intervention.

In some embodiments, the localization module 318 obtains audio-visual input 420 of the environment 410 of the client device 310, the audio-visual input 420 including a reference image 520 and recorded sound 510. In some embodiments, the audio-visual input 420 may be recorded sound 510 only. The recorded sound 510 is captured by a microphone assembly 313 of the client device 310 in a period of time after generation of a localization sound by the client device 310. The reference image 520 is captured by camera assembly 312 on client device 310.

The localization module 318 receives the recorded sound 510 and reference image 520 from the client devices 310. Localization module 318 provides the recorded sounds 510 to feature extractor 530, which generates an embedding 550, the embedding representing the environment in which the audio was recorded. The feature extractor 530 may be pre-trained using extracted features of recorded audio in known locations, and trained to identify the extracted features identifying close distances in physical spaces, as opposed to more spatially distant spaces. Localization module 318 provides reference image 520 to visual descriptor model 535, such as NetVLAD, which outputs an embedding 550 including visual descriptors. Localization module 318 compares the embeddings 550 to the contents of an audiovisual database 580, using a nearest neighbor search, to find the closest match of pre-recorded embeddings 550. The original embeddings 550 as well as the retrieved embeddings from the audiovisual database 580 are provided to gating network 570 to determine the place recognition 460.

In one embodiment, the gating network 570 is a shallow MLP that also takes in as input the match predicted by a visual matching model 540 and outputs a scalar indicating whether to use the position retrieved by vision or audio. The gating network 570 is trained to determine whether the retrieved result from vision is better than the audio. Together, the feature extractor 530, and the visual descriptor model 535, as well as the gating network 570 form a mixture-of-experts type model. In an alternate embodiment, the combination of the feature extractor of 530 and the visual descriptor model 535 may form the mixture-of-experts type model without a gating network, and instead use an intuitive gating function based on the validation step for the retrieval result. For example, if the visual matching model 540 predicts a positive match between the reference image and the retrieved image from the database, localization module 318 may use the location tied to the retrieved image as the resulting place recognition 460. If the visual matching model 540 predicts a negative match between the reference image and the retrieved image from the database, localization module 318 may use the location tied to the retrieved audio as the resulting place recognition 460.

Absolute Pose Estimation

Absolute pose estimation, generally refers to, inferring the camera position and orientation based on a single query frame relative to a pre-scanned environment. The use of audio input in combination with visual input allows the system to capture more information about the scene and so resolve possible scene ambiguities. Localization module 318 processes the audio inputs from a client device, and provides that processed audio input into a machine learning model to determine an absolute pose estimation. Localization module 318 may process the audio input using audio-input only, or in combination with visual inputs as well. The approaches previously discussed for combining audio input with a previously established visual input pipeline for processing such relative pose estimation or place recognition also apply to absolute pose estimation. In another embodiment, the audio features from the feature extractor can be combined with an established absolute pose regression network, such as PoseNet.

Figure 5C:
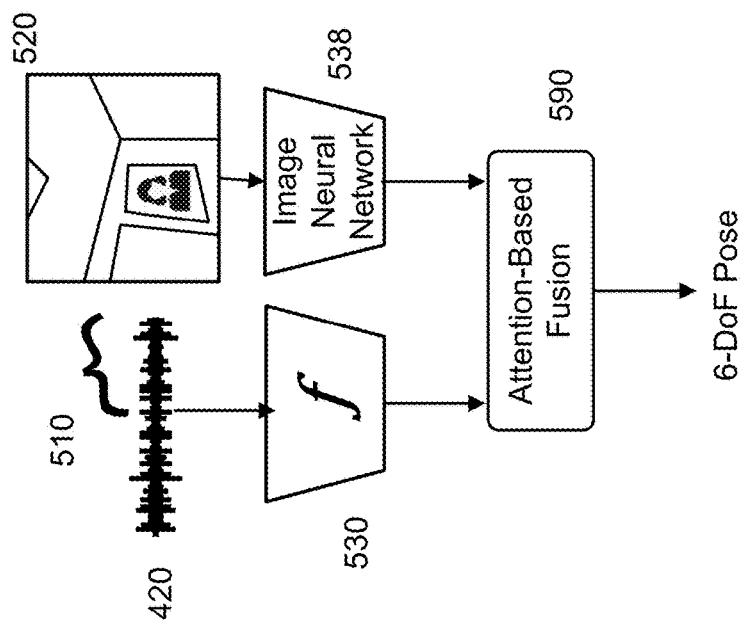
FIG. 5C is a block diagram of a method for absolute pose estimation using audio data, according to one embodiment.

FIG. 5C is a block diagram of one embodiment of a method for absolute pose estimation using audio data. Alternative embodiments may include more, fewer, or different steps from those illustrated in FIG. 5C, and the steps may be performed in a different order from that illustrated in FIG. 5C. These steps may be performed by the localization module 318, which may be hosted on the client device 310, by the game server 320, or by any other device in networked computing environment 300. Additionally, each of these steps may be performed automatically by the localization module 318 without human intervention.

In some embodiments, the localization module 318 obtains audio-visual input 420 of the environment 410 of the client device 310, the audio-visual input 420 including a reference image 520 and recorded sound 510. Alternatively, the audio-visual input 420 may be recorded sound 510 only. In one embodiment, the localization module 318 obtains a reference image 520 of an environment 410 of a client device 310 and obtains recorded sound 510 of the environment 410 of the client device 310. The recorded sound 510 is captured by a microphone assembly 313 of the client device in a period of time after generation of a localization sound by the client device 310. The reference image 520 is captured by camera assembly 312 on client device 310.

The localization module 318 receives the recorded sound 510 and reference image 520 from the client devices 310. Localization module 318 provides the recorded sounds 510 to feature extractor 530, which generates an embedding 550, the embedding being a vector that includes the extracted features. Localization module 318 provides reference image 520 to an image neural network 538, a deep residual network, which outputs an embedding 550 including visual features in a vector. Together, the embeddings 550 from feature extractor 530 and image neural network 538 are fused, using an attention-based fusion model 590, and provided to a Shallow MLP model which produces three vectors. A partial Gram-Schmidt project is used to obtain rotation matrix from the resulting vectors. The parameters are weighted in such a way as to minimize the mean-squared error between the predicted and ground truth poses. The resulting rotation matrix output form the partial Gram-Schmidt projection is the absolute pose estimation 470.

Figure 6:
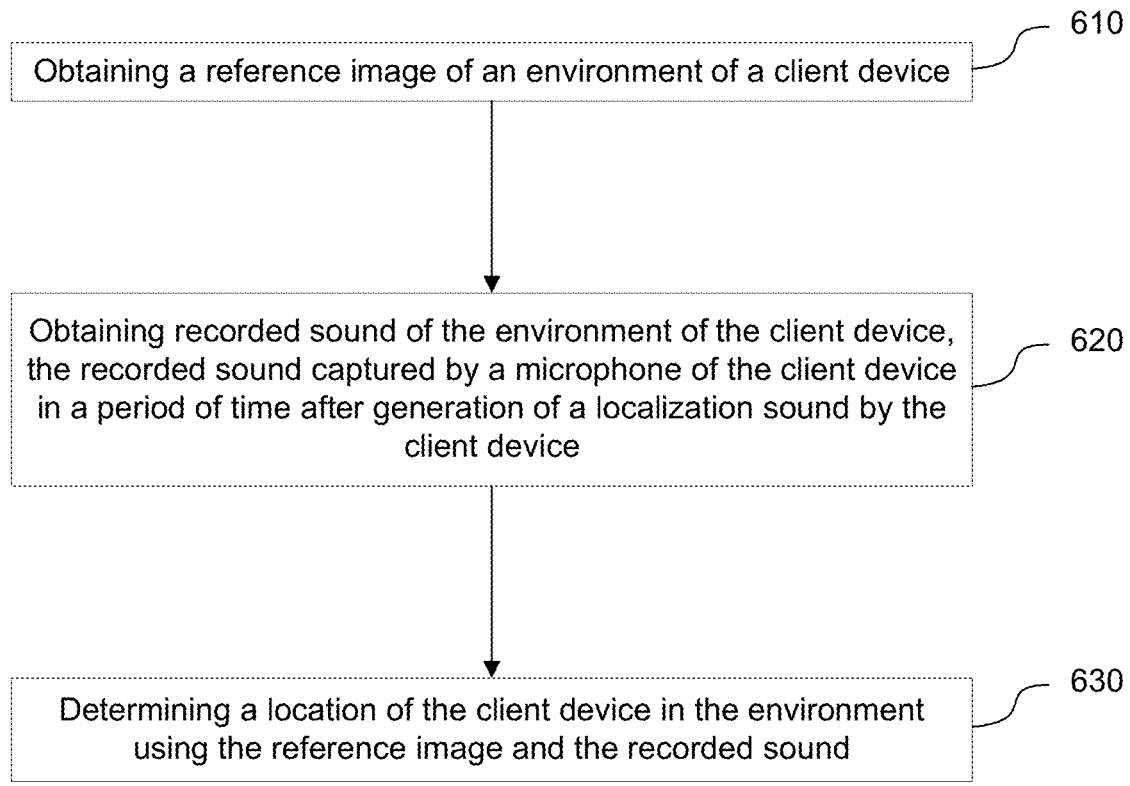
FIG. 6 is a flowchart of a method for localization of a client device using audio data, according to one embodiment.

FIG. 6 is a flowchart of one embodiment of a method for localization of a client device using audio data. Alternative embodiments may include more, fewer, or different steps from those illustrated in FIG. 6, and the steps may be performed in a different order from that illustrated in FIG. 6. These steps may be performed by the localization module 318, which may be hosted on the client device 310, by the game server 320, or by any other device in networked computing environment 300. Additionally, each of these steps may be performed automatically by the localization module 318 without human intervention.

In the embodiment shown, the method begins with the localization module 318 obtaining 610 a reference image of an environment 410 of a client device 310. The reference image may be captured by the camera assembly 312. In some embodiments, a second reference image of the environment 410 is captured by a second camera assembly on a second client device.

The localization module 318 obtains 620 recorded sound of the environment 410 of the client device 310. The recorded sound may be captured by a microphone assembly 313 of the client device 310 in a period of time after generation of a localization sound by the client device 310. In some embodiments, a second microphone assembly from the second client device, obtains a second recorded sound of the environment 410 in the period of time after generation of the localization sound by the second client device.

The localization module 318 determines 630 a location of the client device 310 in the environment 410 using the reference image and the recorded sound. In one embodiment, a second reference image and/or second recorded sound are also used to determine the location of the client device 310, to determine the relative position of the client device 310 in comparison the location of the second client device. In some embodiments, the localization module 318 queries an audio-visual database based on the reference image of the environment and the recorded sound to determine the location of the client device based on query of the audio-visual database. The location of the client device 310 may be a pose that includes an orientation of the client device with respect to the environment.

Example Computing System

Figure 7:
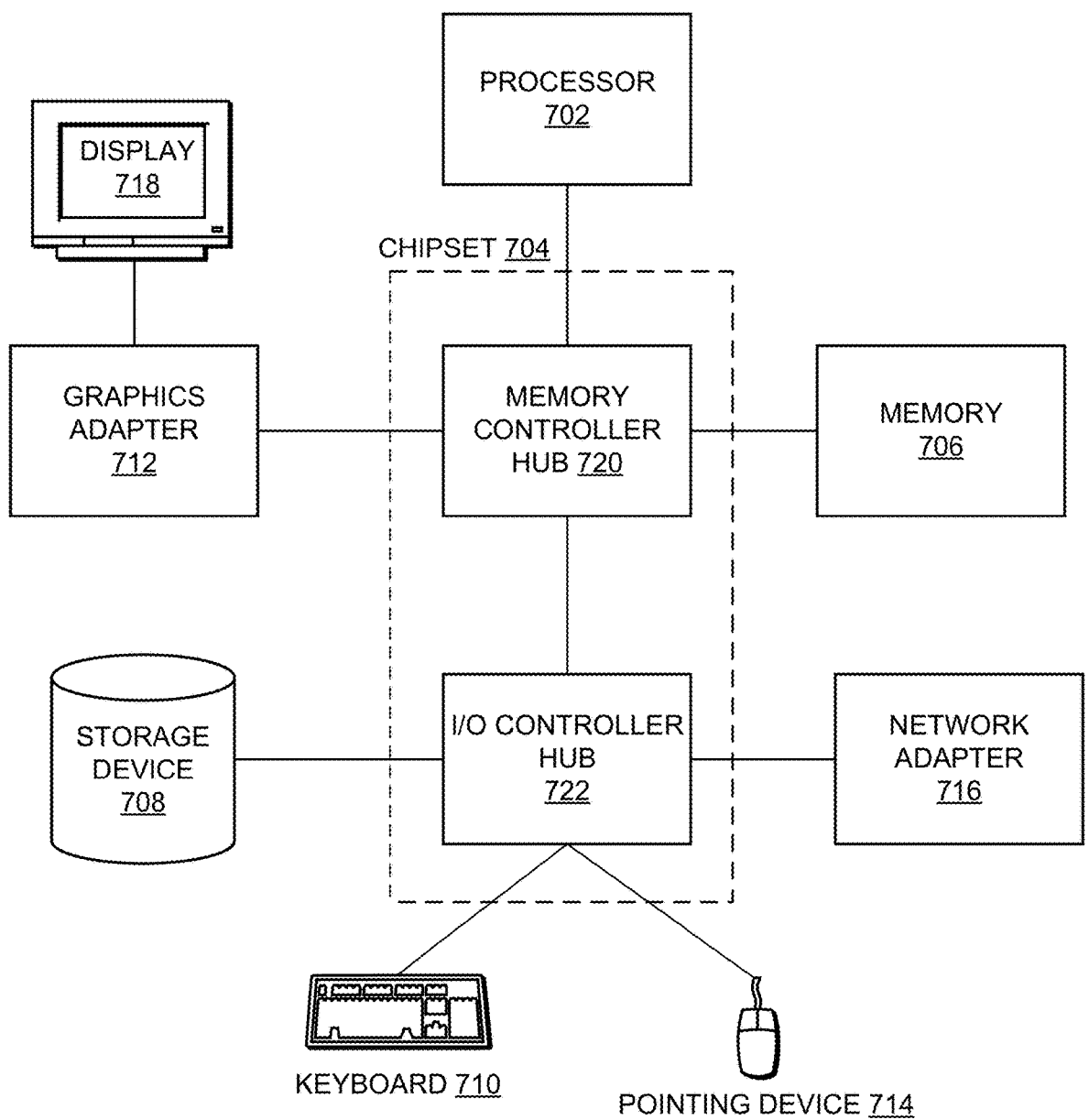
FIG. 7 illustrates an example computer system suitable for use in the networked computing environment of FIG. 1, according to one embodiment.

FIG. 7 is a block diagram of an example computer 700 suitable for use as a client device 310 or game server 320. The example computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touchscreen, or other type of pointing device, and may be used in combination with the keyboard 710 (which may be an on-screen keyboard) to input data into the computer system 700. The graphics adapter 712 displays images and other information on the display 718. The network adapter 716 couples the computer system 700 to one or more computer networks, such as network 370.

The types of computers used by the entities of FIG. 3 can vary depending upon the embodiment and the processing power required by the entity. For example, the game server 320 might include multiple blade servers working together to provide the functionality described. Furthermore, the computers can lack some of the components described above, such as keyboards 710, graphics adapters 712, and displays 718.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present), and B is false (or not present), A is false (or not present), and B is true (or present), and both A and B are true (or present).

Upon reading this disclosure, those of skill in the art will appreciate still additional alternative structural and functional designs for a system and a process for providing the described functionality. Thus, while particular embodiments and applications have been illustrated and described, it is to be understood that the described subject matter is not limited to the precise construction and components disclosed. The scope of protection should be limited only by any claims that ultimately issue.

What is claimed is:

1. A computer-implemented method for localization, the method comprising:
    obtaining a reference image of an environment of a client device;
    obtaining recorded sound of the environment of the client device, the recorded sound captured by a microphone of the client device in a period of time after generation of a localization sound by the client device; and determining a location of the client device in the environment using the reference image and the recorded sound, wherein determining the location comprises:
extracting features from the recorded sound and the reference image;
determining candidate poses based on the features extracted from the recorded sound and the reference image; and
selecting between the candidate poses, wherein selecting between the candidate poses comprises:
providing the candidate poses as input to a learned gating function; and
obtaining from the learned gating function an output indicating whether to use a candidate pose based on the recorded sound or a candidate pose based on the reference image.

2. The method of claim 1 further comprising:
obtaining a second recorded sound, wherein the second recorded sound is a recorded sound of the environment captured by a second microphone in the period of time after generation of the localization sound by a second client device; and
determining a location of the second microphone relative to the location of the client device in the environment using the second recorded sound.

3. The method of claim 2 further comprising:
obtaining a second reference image of the environment based on a second client device; and
determining a location of the second client device relative to the location of the client device in the environment using the second recorded sound and the second reference image.

4. The method of claim 1 further comprising:
querying an audio-visual database based on the reference image of the environment and the recorded sound; and
determining the location of the client device based on query of the audio-visual database.

5. The method of claim 1 further comprising:
receiving, at a server, the reference image and the recorded sound, wherein the determining of the location of the client device in the environment is performed by the server; and
providing, to the client device, the location of the client device.

6. The method of claim 1 wherein the location of the client device includes a description of an orientation of the client device with respect to the environment.

7. The method of claim 1, wherein the determining of the location of the client device in the environment is determined at the client device.

8. The method of claim 1, wherein determining candidate poses based on the features extracted from the recorded sound and the reference image further comprises comparing the features extracted from the recorded sound and the reference image to features from an audio-visual database.

9. A non-transitory computer-readable medium storing computer-executable instructions for localization that, when executed by a computing system, cause the computing system, to perform operations comprising:
obtaining a reference image of an environment of a client device;
obtaining recorded sound of the environment of the client device, the recorded sound captured by a microphone of the client device in a period of time after generation of a localization sound by the client device; and
determining a location of the client device in the environment using the reference image and the recorded sound, wherein determining the location comprises:
extracting features from the recorded sound and the reference image;
determining candidate poses based on the features extracted from the recorded sound and the reference image; and
selecting between the candidate poses, wherein selecting between the candidate poses comprises:
providing the candidate poses as input to a learned gating function; and
obtaining from the learned gating function an output indicating whether to use a candidate pose based on the recorded sound, a candidate pose based on the reference image, or an optimal combination of the candidate poses.

10. The computer-readable medium of claim 9 wherein the operations further comprise:
obtaining a second recorded sound, wherein the second recorded sound is a recorded sound of the environment captured by a second microphone in the period of time after generation of the localization sound by a second client device; and
determining a location of the second microphone relative to the location of the client device in the environment using the second recorded sound.

11. The computer-readable medium of claim 10 wherein the operations further comprise:
obtaining a second reference image of the environment based on a second client device;
and determining a location of the second client device relative to the location of the client device in the environment using the second recorded sound and the second reference image.

12. The computer-readable medium of claim 9 wherein the operations comprise:
querying an audio-visual database based on the reference image of the environment and the recorded sound; and
determining the location of the client device based on query of the audio-visual database.

13. The computer-readable medium of claim 9 wherein the location of the client device includes a description of an orientation of the client device with respect to the environment.

14. A computer-implemented method for localization, the method comprising:
obtaining a reference image of an environment of a client device;
obtaining recorded sound of the environment of the client device, the recorded sound captured by a microphone of the client device in a period of time after generation of a localization sound by the client device; and
determining a location of the client device in the environment using the reference image and the recorded sound, wherein determining the location comprises:
extracting features from the recorded sound and the reference image;
determining candidate poses based on the features extracted from the recorded sound and the reference image; and
selecting between the candidate poses, wherein selecting between the candidate poses comprises:
providing the candidate poses as input to a learned gating function; and obtaining from the learned gating function an output indicating an optimal combination of the candidate poses.

15. The method of claim 14 further comprising:
obtaining a second recorded sound, wherein the second recorded sound is a recorded sound of the environment captured by a second microphone in the period of time after generation of the localization sound by a second client device; and
determining a location of the second microphone relative to the location of the client device in the environment using the second recorded sound.

16. The method of claim 15 further comprising:
obtaining a second reference image of the environment based on a second client device; and
determining a location of the second client device relative to the location of the client device in the environment using the second recorded sound and the second reference image.

17. The method of claim 14 further comprising:
querying an audio-visual database based on the reference image of the environment and the recorded sound; and
determining the location of the client device based on query of the audio-visual database.

18. The method of claim 14 further comprising:
receiving, at a server, the reference image and the recorded sound, wherein the determining of the location of the client device in the environment is performed by the server; and
providing, to the client device, the location of the client device.

19. The method of claim 14 wherein the location of the client device includes a description of an orientation of the client device with respect to the environment.

20. The method of claim 14, wherein determining candidate poses based on the features extracted from the recorded sound and the reference image further comprises comparing the features extracted from the recorded sound and the reference image to features from an audio-visual database.

* * * * *